Aug. 28, 1951 J. L. DELVAUX 2,566,056

KEYSTONE CORRECTION CIRCUIT

Filed Feb. 14, 1948

Inventor:
Jean L. Delvaux,
by Merton D. Morse
His Attorney.

Patented Aug. 28, 1951 2,566,056

UNITED STATES PATENT OFFICE 2,566,056

KEYSTONE CORRECTION CIRCUIT

Jean L. Delvaux, Asnieres, France, assignor to General Electric Company, a corporation of New York Application February 14, 1948, Serial No. 8,407
In France October 5, 1943

Section 1, Public Law 690, August 8, 1946
Patent expires October 5, 1963

4 Claims. (Cl. 250—27)

My invention relates to television equipment and, more particularly, to a keystone correction circuit.

In television equipments, it is necessary to obtain a scanning wave having a sawtooth wave form at the frequency of the rapid horizontal scanning whose amplitude is modulated in trapezoidal or keystone shape by a sawtooth waveform at the frequency of the slow vertical scanning. This modulation is necessary when the scanning signals are to be applied to a cathode ray tube or the like, the target of which is not at right angles to the axis of the electron gun.

There exists, among others, a method which is well known to those skilled in the art, for obtaining such a wave but that method requires the use of at least four electron discharge devices.

An object of my invention is to obtain a scanning wave by means of only two electron discharge devices.

Another object of my invention is to provide an improved method for obtaining a keystoned scanning wave.

For additional objects and advantages, and for a better understanding of the invention, attention is now directed to the following description and accompanying drawing, and also to the appended claims in which the features of the invention believed to be novel are particularly pointed out.

Figure 1:
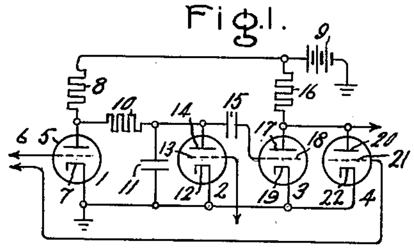
Fig. 1 is a schematic diagram of a known circuit that requires at least four tubes.

Referring now to Fig. 1, I have shown a known circuit for producing a scanning wave which comprises the electron discharge devices 1, 2, 3 and 4. The device 1 amplifies the slow sawtooth wave at the frequency of the vertical or image scanning, and transforms it into a modulating voltage that is applied to an integrating system which comprises a resistor 10 and capacitor 11. This modulating voltage is applied to an anode 14 of the device 2. The grid 13 of the device 2 receives short impulses at the frequency of the rapid or horizontal scanning. The anode circuit of the device 2 is arranged so as to discharge the capacitor 11. A voltage appears on the capacitor 11 that has a sawtooth waveform at the horizontal frequency whose beginning corresponds to a constant voltage and whose apex is of variable height. The envelope of these apexes constitutes a sawtooth waveform of vertical frequency. Such a voltage, represented by a rapid sawtooth wave form, is similar to that illustrated in curve D of Fig. 5 and is not symmetrical with respect to a central axis. To establish such a symmetry, it is customary to use a third electron discharge device 3 whose grid 18 receives the above voltage and whose anode circuit is parallel with that of a fourth electron discharge device 4 whose grid 21 receives a sawtooth wave form voltage of vertical frequency and of the same phase as that applied to the grid 6 of the device 1. The voltage which prevails on the common anode circuit, may be applied to appropriate amplifiers and has the form generally represented by the curve E of Fig. 5. The operation performed by the device 4, is called the trapezoidal or keystone correction.

Figure 2:
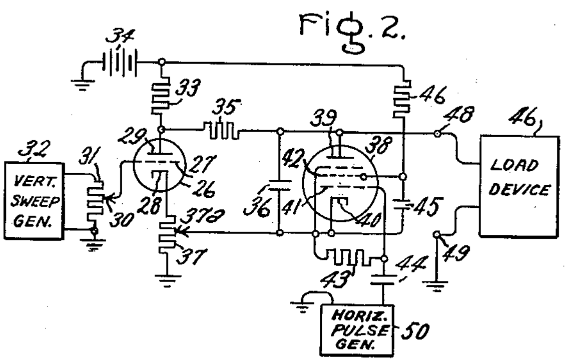
Fig. 2 is a schematic diagram illustrating one embodiment of my invention.

Referring now to Fig. 2, I have shown an electron discharge device 26 having a grid 27 connected to an adjustable contact 30 on a potentiometer 31 which receives, from a suitable generator 32, a sawtooth potential at the vertical scanning frequency. Its anode 29 is energized from a suitable supply, which I have shown as a battery 34 for purposes of illustration, through a resistor 33. The anode circuit is connected directly to an integrator circuit comprising resistance 35 and capacitor 36. The lower terminal of the capacitor 36 is connected to the sliding contact 37*a* of a potentiometer 37 in the common cathode circuit between cathode 28 of the device 26 and ground. The anode-cathode path of a second electron discharge device 38 is connected directly across the capacitor 36. Device 38 has a screen grid 42 supplied from battery 34 through a resistance 46. A bypass capacitor 45 is connected between the screen 42 and cathode 40 for uncoupling. The control grid 41 of device 38 receives impulses at the horizontal scanning frequency from a suitable generator 50 through a capacitor 44. A grid leak resistor 43 is also provided between grid 41 and cathode 40. The output voltage is taken between terminals 48 and 49, which may be connected to any suitable load device 46, for example an amplifier.

Figure 5:
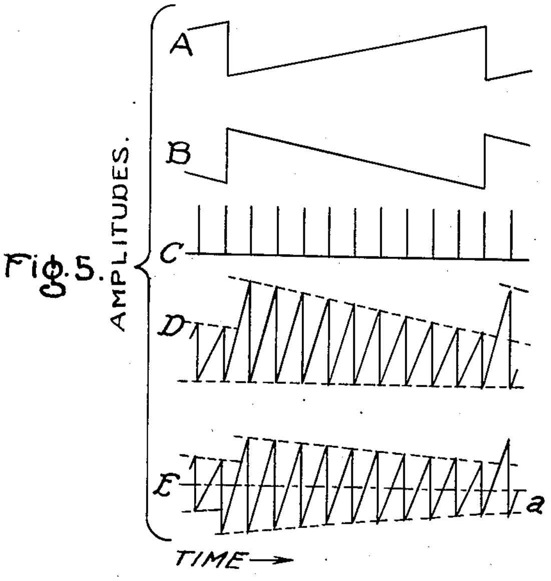
Fig. 5 is a group of curves on a common time scale illustrating certain principles underlying my invention.

In Fig. 5 the curve A represents the form of the voltage supplied to the control electrode 27 of the device 26, and to a different scale the voltage prevailing on the cathode 28 and the sliding contact 37*a* of the potentiometer 37. In the curve B I have illustrated the form of the voltage at the anode 29 of the device 26. The curve C represents the form of the impulses produced by the generator 50. The curve D represents the voltage at the terminals of the capacitor 36. It will be observed that this voltage is made up of sawtooth oscillations, the amplitude of which varies directly with the amplitude of the voltage at the anode 29. The output load voltage between the terminals 48 and 49 is represented by the curve E and is the algebraic sum of the voltage of curve D and the voltage existing between sliding contact 37*a* and ground. It may be made symmetrical with respect to an axis *a* by means of a correct adjustment of the sliding contact 37*a*. This symmetry is not affected if one varies the amplitude of the image sawtooth oscillations applied to the device 26 from potentiometer 31 for the purpose of modifying the depth of the trapezoidal modulation.

When impulses of large amplitude are applied to the grid of electron discharge device 38 through capacitor 44, the impulses have their positive crests aligned along a voltage close to that of the cathode of that device. The polarization adjusts itself automatically accordingly. In the interval between two successive impulses and because of the presence of the leakage resistor 43, this polarization decreases, but at the arrival of the following impulse, the positive crest of the latter tends to go beyond the alignment of the potential, which starts an influx of grid current which reestablishes the polarization.

In the operation of the device at the moment when the following impulse arrives, the potential of the cathode 40 of the device 38 has increased by a certain quantity owing to the application to the cathode 40 of a sawtooth oscillation at image frequency. It is possible to regulate the time constant of the circuit 43 and 44 in such a way that the loss of the charge of capacitor 44 between two impulses at line frequency will be close to the quantity at which the potential of the anode 39 will have increased during the same time, while being slightly above that quantity in absolute value. If the time constant of 43 and 44 is comparable to the image frequency, the capacitor 44 would remain charged and the performance of the device 38 would become incorrect.

Briefly summarizing the operation of the embodiment of Fig. 2, discharge device 26 receives on its grid impulses at the vertical scanning frequency. The second terminal of the system (at the lower terminal of capacitor 36) is no longer connected to ground as was done in the known system of Fig. 1, but is connected to a suitable point on the circuit of one of the electrodes in the device 26, this electrode being selected in such a way that there appears on it a sawtooth voltage of vertical frequency and of the same phase as that applied to the control grid of the device 26. There is also impressed, between the upper terminal of the integrating capacitor 36 and ground, a sawtooth voltage at a horizontal frequency whose amplitude is modulated according to a sawtooth voltage at vertical frequency. This voltage can be made symmetrical with respect to a central axis provided there is correct regulation of the voltage applied to the upper terminal. The horizontal frequency impulses are applied between ground and the grid 42 of the device 38 by means of a circuit 43, 44 having a suitable resistance and capacitance, the time constant of which is small with respect to the period of line scanning. This time constant is fixed at such a value with respect to the period of the impulses that any loss in the charge of the capacitor during the interval between two consecutive impulses will be less than, but close to, the variation throughout the same time of the voltage between ground and the upper terminal.

It goes without saying that the potentiometer 37 could be inserted in the circuit of another electrode of the device 26, provided the phase of the voltage appearing at 37 is correct. This electrode could be a target for secondary emission or it could even be the grid of the device 26, the potentiometer 37 being inserted between ground and a sliding contact 30 of the potentiometer 31.

Figure 3:
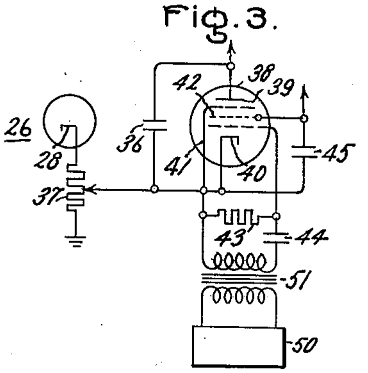
Fig. 3 and Fig. 4 are modifications of Fig. 2.

Fig. 3 represents a variant of a portion of Fig. 2 in which the impulses produced by generator 50 are transmitted to the grid 42 of the device 38 by means of a transformer 51 whose secondary is connected between the cathode 40 and the capacitor 44. In this example, the time constant of the circuit 43 and 44 may be considerable as compared to the period of said impulses.

Figure 4:
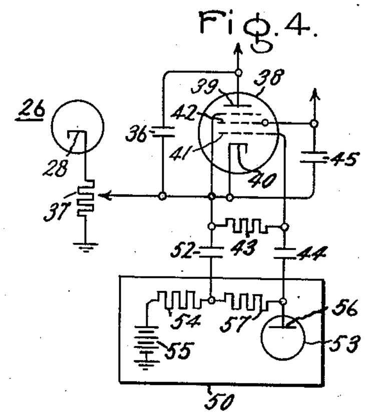

Fig. 4 represents another variant of a portion of Fig. 2 in which the anode circuit of an output tube 53 in the generator 50 is biased by means of a capacitor 52 from the cathode 40 of the device 38. The tube 53 is preferably of the pentode type. A resistance 54 is used for decoupling the anode 56 of the device 53 and the horizontal impulses are developed on a resistance 57 and transmitted by the capacitor 44 to the grid 42 of the device 38.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In a television keystone correcting circuit, a source of vertical sweep frequency voltage, a first grid-controlled electron discharge device having a grid energized from said source and having an anode load impedance and a common cathode load impedance, an integrating circuit including resistance and capacitance in series connected from a point on said anode impedance to a point on said cathode impedance, said last circuit having a time constant which is long with respect to the period of a cycle at line sweep frequency, a second grid-controlled electron discharge device having an anode to cathode path directly in shunt to said capacitance, a source of pulses at line sweep frequency connected to the control grid of said second device, said pulses periodically rendering said second device conductive to discharge said capacitor at line frequency, an output load circuit connected across said capacitance and a portion of said cathode load impedance in series, and means for adjusting the relative amplitudes of said vertical sweep voltages impressed on said integrating circuit from said impedances.

2. In a television keystone correction circuit a source of vertical sweep frequency voltage, a first grid-controlled electron discharge device having a grid energized from said source and having an anode load impedance and a common cathode load impedance, an integrating circuit, including resistance and capacitance in series, connected from a point on said anode impedance to a point on said cathode impedance, a second grid controlled electron discharge device having an anode to cathode path directly in shunt to said capacitance, a source of pulses at the line sweep frequency connected to the control grid of said second device, said pulses periodically rendering said second device conductive to discharge said capacitance at line frequency, an output load circuit connected across said capacitance and a portion of said cathode load impedance in series, means for adjusting the relative amplitude of said vertical sweep voltages impressed on said integrating circuit from said impedances.

3. A television keystone correcting circuit comprising a source of sawtooth waves of vertical sweep frequency, a first grid-controlled discharge device having its grid energized from said source and having separate anode and cathode load resistances in its anode circuit, whereby oppositely-varying sawtooth voltages of said frequency appear on said respective resistances, means for generating sawtooth voltage of horizontal sweep frequency comprising a capacitor connected between points on said respective resistances through a charging resistor, a second grid-controlled discharge device having its anode-to-cathode path connected across said capacitor, a source of impulses recurring at line frequency, means for impressing said impulses between the grid and cathode of said second device in a sense to render it recurrently conducting, the envelope amplitude of said horizontal sweep voltage developed across said capacitor being thereby modulated by the vertical sweep voltage across said anode resistance, means for impressing the sum of said horizontal sweep voltage and a portion of the vertical sweep voltage across said cathode resistance upon an output load device, and means for adjusting the magnitude of said portion to render the envelope of said horizontal sweep voltage applied to said device symmetrical with respect to its alternating current axis.

4. A television keystone correcting circuit comprising a source of vertical sweep voltage, a first electron discharge device having an anode, cathode and control grid, a cathode impedance connected between said cathode and a common reference point, said source being connected between said grid and point, an anode impedance and a source of anode operating potential connected in series between said anode and said point, a line sweep voltage generating circuit comprising a resistor and a capacitor in series connected between points on said respective impedances, a second grid-controlled electron discharge device having its anode-to-cathode path connected directly across said capacitor, a source of line frequency pulses, means for impressing said pulses between the grid and cathode of said second device, said pulses periodically rendering said second device conductive to discharge said capacitor at line scanning frequency, an output load circuit connected between the anode of said second device and said point, and means for adjusting the magnitude of the vertical sweep voltage impressed on said load circuit from said cathode impedance relative to the line sweep voltage developed across said capacitor.

JEAN L. DELVAUX.

REFERENCES CITED

The following references are of record in the file of this patent:

UNITED STATES PATENTS

| Number | Name | Date |
|---|---|---|
| 2,176,973 | Bowman-Manifold | Oct. 24, 1939 |
| 2,271,070 | Grenfell | Jan. 27, 1942 |